United States Patent
Liu et al.

(10) Patent No.: US 8,027,079 B2
(45) Date of Patent: Sep. 27, 2011

(54) METHODS OF FABRICATING DISPLAY DEVICE AND FELXIBLE COLOR DISPLAY MEDIUM MODULE THEREOF

(75) Inventors: Su-Cheng Liu, Hsinchu (TW); Ted-Hong Shinn, Hsinchu (TW); Yi-Ching Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 134 days.

(21) Appl. No.: 12/406,935

(22) Filed: Mar. 18, 2009

(65) Prior Publication Data

US 2010/0202076 A1    Aug. 12, 2010

Related U.S. Application Data

(63) Continuation-in-part of application No. 12/402,432, filed on Mar. 11, 2009.

(30) Foreign Application Priority Data

Feb. 9, 2009   (TW) ............................... 98104112 A

(51) Int. Cl.
*G02F 1/01* (2006.01)

(52) U.S. Cl. ........................................ 359/240; 359/296

(58) Field of Classification Search .................. 359/296, 359/290, 238, 240; 345/107
See application file for complete search history.

(56) References Cited

U.S. PATENT DOCUMENTS

| | | | |
|---|---|---|---|
| 7,781,047 B2 * | 8/2010 | Majumdar et al. | 428/195.1 |
| 2003/0214697 A1 * | 11/2003 | Duthaler et al. | 359/296 |
| 2008/0304134 A1 * | 12/2008 | Ban | 359/296 |
| 2009/0078938 A1 * | 3/2009 | Yamazaki | 257/59 |
| 2009/0266471 A1 * | 10/2009 | Kim et al. | 156/67 |
| 2010/0073279 A1 * | 3/2010 | Kwon et al. | 345/107 |

* cited by examiner

Primary Examiner — Joseph P Martinez
(74) Attorney, Agent, or Firm — Chun-Ming Shih

(57) ABSTRACT

A method of fabricating the flexible color display medium module includes the steps of: forming a flexible substrate on a rigidly substrate; forming a color filter film comprising a plurality of color filter patterns; forming the display medium layer on the color filter film; and separating the flexible substrate from the rigidly substrate. Since the display medium layer is immediately disposed on the color filter film, the accuracy of aligning the display medium layer and the color filter film may be improved and the parallax resulted from the light passed through the display medium layer and the color filter film may be reduced.

8 Claims, 6 Drawing Sheets

METHODS OF FABRICATING DISPLAY DEVICE AND FELXIBLE COLOR DISPLAY MEDIUM MODULE THEREOF

This application claims priority to a Taiwan application No. 098104112 filed Feb. 9, 2009. This is a continuation-in-part (CIP) of application Ser. No. 12/402,432 filed Mar. 11, 2009, entitled "METHODS OF FABRICATING DISPLAY PANEL AND FLEXIBLE COLOR FILTER THEREOF".

BACKGROUND

1. Field of the Invention

The invention relates to a method of fabricating display medium module, and more particularly, to methods of fabricating a flexible color display medium module and a display panel with the same.

2. Description of the Related Art

With progress of the flat panel display technique, more and more electrical products, especially portable electrical products such as mobile phones, e-books, digital cameras and personal digital assistants etc., are equipped with flat panel display apparatuses. The development trend of the portable electrical product is to achieve light weight and thin thickness, so the flat panel display apparatus for the portable electrical product should have these features.

It is well known that the flexible panel display not only has features of light weight and thin thickness, but also has features of flexibility and is not easy to be broken. Therefore, the development of the flexible panel display has become increasingly important. Nowadays, the popular flexible display panel is the electro-phoretic display (so-called EPD) panel. During the fabricating process of conventional electro-phoretic display panel, an electro-phoretic film is disposed on a substrate with an active elements array or a passive elements array. Then, a color filter is assembled on the electro-phoretic film.

However, during the process of assembling the color filter, the parallax is resulted with the light passed through the color filter film and the display medium layer due to the unaligned color filter and the electro-phoretic film and the quality of images displayed by the display panel is debased.

BRIEF SUMMARY

Therefore, the invention is directed to a method of fabricating a flexible color display medium module for increasing the accuracy of aligning the color filter film and the display medium layer.

The invention is also directed to a flexible color display medium module for decreasing the parallax resulted with the light passed through the color filter film and the display medium layer.

The invention is further directed to a method of fabricating a display panel for increasing the accuracy of aligning the flexible color display medium module and the controlling elements array substrate of the display panel. Accordingly, the process yield of the display panel may be improved.

The invention provides a method of fabricating a flexible color display medium module. First, a rigid substrate is provided and a flexible substrate is formed on the rigid substrate. Next, a color filter film comprising a plurality of color filter patterns are formed on the flexible substrate and a display medium layer is formed on the color filter film. Then, the flexible substrate is separated from the rigid substrate.

The invention also provides a method of fabricating a display panel. First, a flexible color display medium module is formed by the aforementioned steps and a controlling elements array substrate with a display region and a peripheral circuit region is formed. Next, the flexible color display medium module is assembled to above the controlling elements array substrate for positioning the display medium layer on the controlling elements array substrate. Then, a driving circuit is disposed on the controlling elements array substrate and located in the peripheral circuit region.

According an embodiment of the invention, the method of separating the flexible substrate from the rigid substrate comprises laser releasing method.

According an embodiment of the invention, a light-shielding layer with a plurality of openings is formed before forming the color filter film on the flexible substrate, and then the color filter patterns are formed in the openings.

According an embodiment of the invention, a second rigid substrate is provided before forming the controlling elements array substrate, and then the controlling elements array substrate is formed on the rigid substrate. The controlling elements array substrate is separated from the second rigid substrate by, for example, laser releasing method after disposing the driving circuit thereon.

The invention provides a flexible color display medium module comprising a flexible substrate, a color filter film comprising a plurality of color filter patterns and a display medium layer. The color filter film is disposed on the flexible substrate and the display medium layer is disposed on the color filter film.

According an embodiment of the invention, the flexible color display medium module further comprises a light-shielding layer with a plurality of openings disposed on the flexible substrate. The color filter patterns are formed in the openings.

According an embodiment of the invention, the color filter patterns comprise red color filter patterns, green color filter patterns and blue color filter patterns. Moreover, the color filter film may comprise white color filter patterns in another embodiment.

According an embodiment of the invention, the color filter patterns comprise cyan color filter patterns, yellow color filter patterns and magenta color filter patterns. Moreover, the color filter film may comprise black color filter patterns in another embodiment.

According an embodiment of the invention, the material of the flexible substrate may be polyimide, polyethylene terephathalate, polyether ether ketone, polyethylene naphthalene, polymethyl methacrylate, polystyrene, polyarylate, polycarbonate, TAC or ARTON.

According an embodiment of the invention, the display medium layer may be an electro-phoretic film or an electro-wetting film.

In the invention, since the color filter film and the display medium layer are formed sequentially on the flexible substrate formed on the rigid substrate and then the flexible substrate is separated from the rigid substrate, the process yield and the capacity of the flexible color display medium module and the display panel with the same may be improved. Furthermore, since the display medium layer is disposed immediately on the color filter film in the invention, the accuracy of aligning the display medium layer and the color filter film may be increased and the parallax resulted with the light passed through the display medium layer and the color filter film may be decreased.

In order to make the aforementioned and other objects, features and advantages of the invention comprehensible, preferred embodiments accompanied with figures are described in detail below. It is to be understood that both the foregoing general description and the following detailed description are exemplary, and are intended to provide further explanation of this invention as claimed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
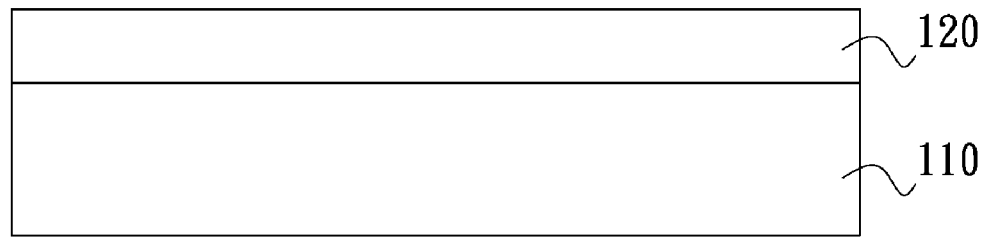
FIG. 1A to FIG. 1D are schematic cross-section views illustrating the flexible color display medium module during the fabricating process thereof according to an embodiment of the invention.

FIG. 1A to FIG. 1D are schematic cross-section views illustrating the flexible color display medium module during the fabricating process thereof according to an embodiment of the invention. Referring to FIG. 1A, a flexible substrate 120 is formed on a rigid substrate 110. The material of the rigid substrate 110 is, for example, glass or stainless steel and the material of the flexible substrate 120 may be polyimide, polyethylene terephathalate, polyether ether ketone, polyethylene naphthalene, polymethyl methacrylate, polystyrene, polyarylate, polycarbonate, TAC or ARTON.

Figure 1B:
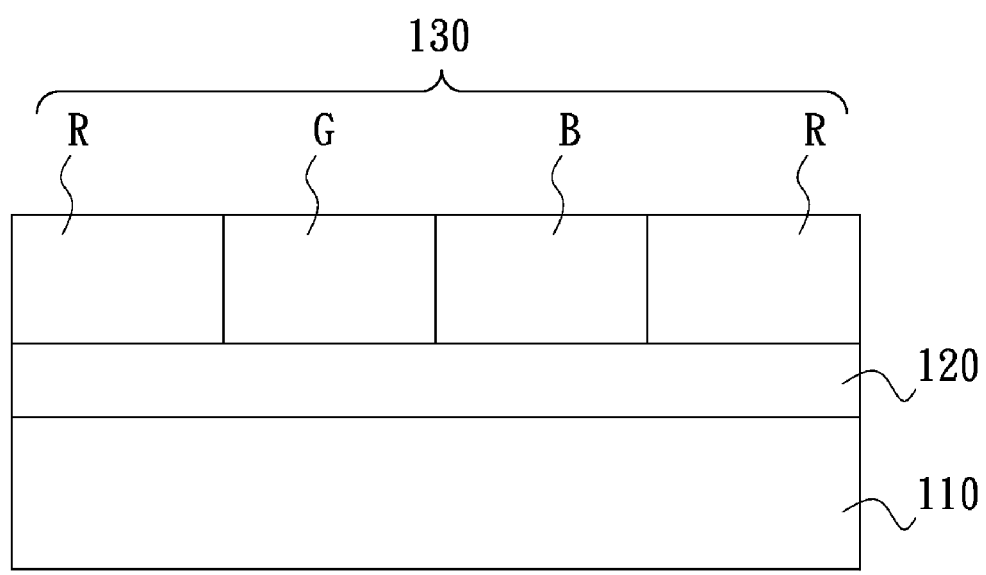
Figure 2:
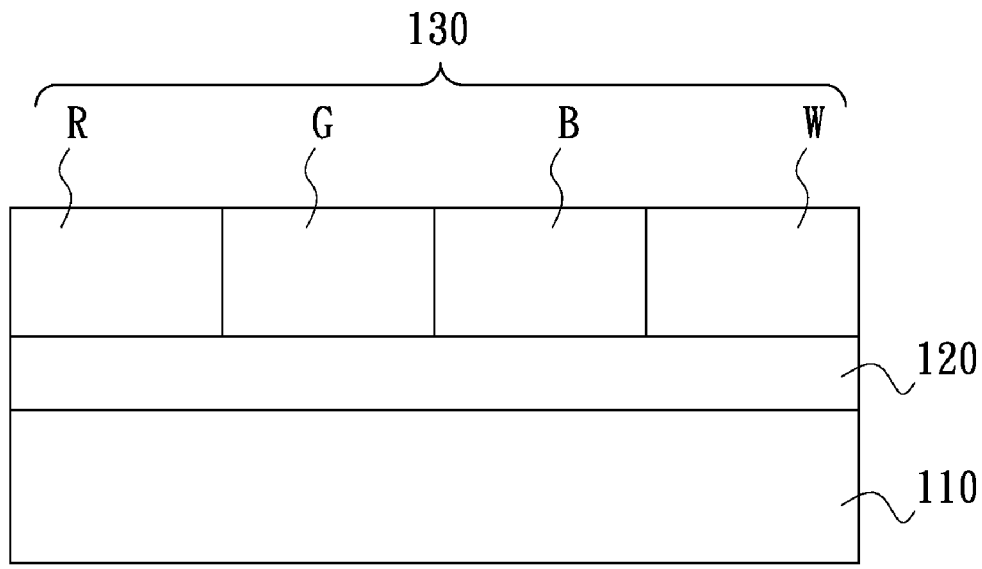
FIG. 2 is a schematic cross-section view illustrating the color filter film formed on the flexible substrate according to another embodiment of the invention.

Referring to FIG. 1B, a color filter film 130 is formed on the flexible substrate 120. In this embodiment, the color filter film 130 comprises a plurality of color filter patterns such as red color filter patterns R, green color filter patterns G and blue color filter patterns B. In the other embodiment, the color filter film 130 may also comprise white color filter patterns W for increasing the display brightness, as shown in FIG. 2. It should be noted that the color filter patterns may formed by lithographic and etching process. Furthermore, the color filter patterns may not only comprise cyan color filter patterns, yellow color filter patterns and magenta color filter patterns, also black color filter patterns. The colors of the color filter patterns of the invention are not limited hereto.

Figure 3:
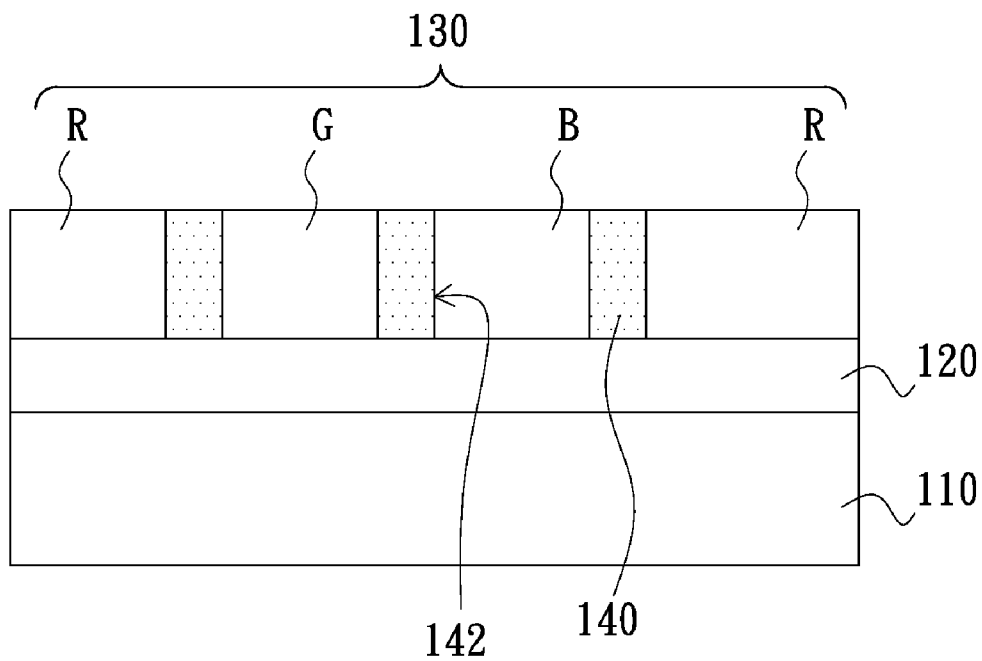
FIG. 3 is a schematic cross-section view illustrating the light-shielding layer and the color filter film formed on the flexible substrate according to another embodiment of the invention.

Moreover, a light-shielding layer 140 with a plurality of openings 142 may be formed on the flexible substrate 120 for improving the contrast of the display images and preventing the light from mixing before forming the color filter film 130 in another embodiment, as shown in FIG. 3. Then, the color filter patterns of the color filter film 130 are formed in the openings 142 and the material of the light-shielding layer 140 is, for example, resin or the other opaque materials.

Figure 1C:
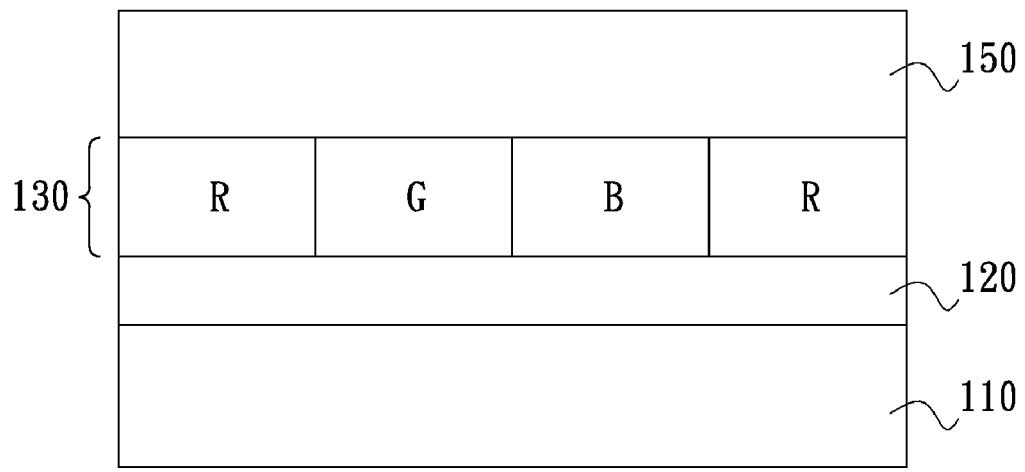

Referring to FIG. 1C, a display medium layer 150 is formed on the color filter film 130. In this embodiment, the display medium layer 150 may be an electro-phoretic film or an electro-wetting film. Specifically, the display medium layer 150 is, for example, formed by disposing an electro-phoretic layer or an electro-wetting layer between two plastic substrates. The electro-phoretic layer may be micro-cup type or micro-capsule type, but the invention is not limited hereto.

Figure 1D:
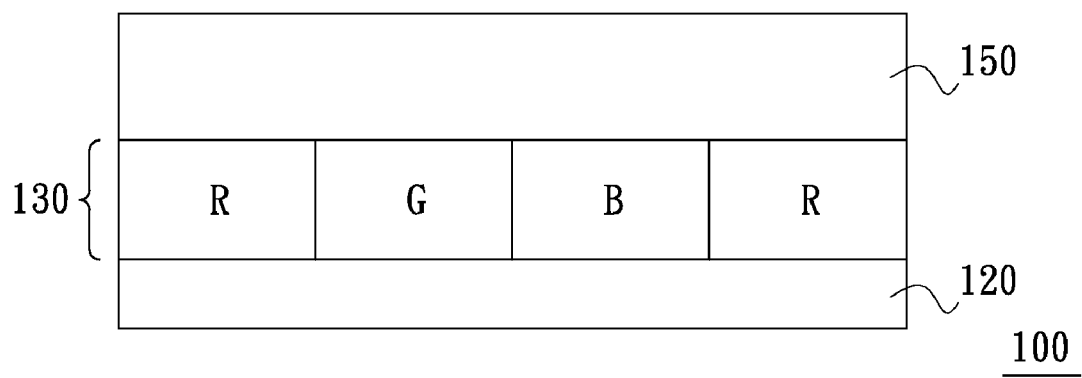

Referring to FIG. 1D, the flexible substrate 120 is separated from the rigid substrate 110 to form a flexible color display medium module 100. For example, the flexible substrate 120 is separated from the rigid substrate 110 by the laser releasing method.

Since the display medium layer 150 is disposed immediately on the color filter film 130, the problem of aligning the display medium layer 150 to the color filter film 130 may be solved and the parallax resulted from the refraction optical path difference of the light passed through the display medium layer 150 and the color filter film 130 may be decreased.

Besides, the flexible substrate 120 is separated from the rigid substrate 110 after finishing the whole processes of the elements disposed on the flexible substrate 120, so the yield and capacity of the flexible color display medium module 100 may be improved substantially. The application of the flexible color display medium module 100 would be described in the follow-up paragraphs, but the invention is not limited hereto.

Figure 4A:
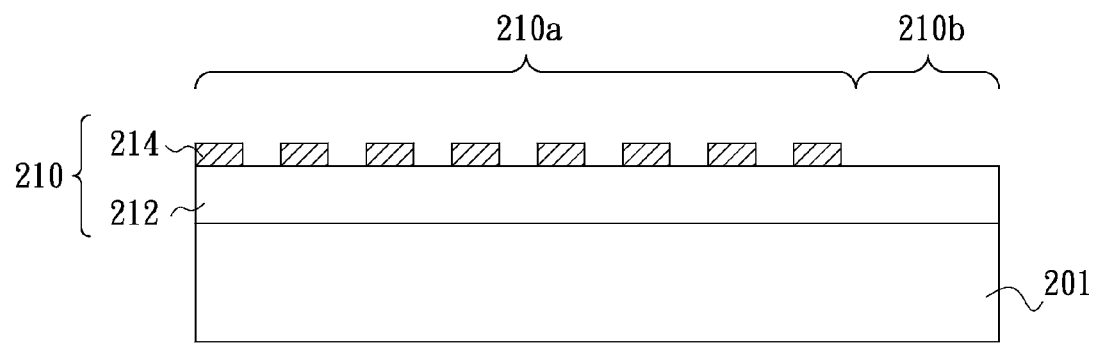
FIG. 4A to FIG. 4D are schematic cross-section views illustrating a display panel during the fabricating process thereof according to an embodiment of the invention.

FIG. 4A to FIG. 4D are schematic cross-section views illustrating a display panel during the fabricating process thereof according to an embodiment of the invention. Referring to FIG. 4A, a controlling elements array substrate 210 with a display region 210a and a peripheral circuit region 210b is formed first. In detail, the controlling elements array substrate 210 comprises a substrate 212 and a plurality of pixel units 214 formed thereon. The places where the pixel units 214 disposed is determined as the display region 210a of the controlling elements array substrate 210.

It is worth to say that the controlling elements array substrate 210 of this embodiment may be flexible. During the process of fabricating the flexible controlling elements array substrate 210, the substrate 212 with flexibility is formed on a rigid substrate 201 first. The material of the substrate 212 is similar to or the same with the material of the aforementioned flexible substrate 120, it is unnecessary to say herein. Then, the pixel units 214 are formed on the substrate 212. That is, the controlling elements array substrate 210 is formed on the rigid substrate 201 first in the invention.

Figure 5:
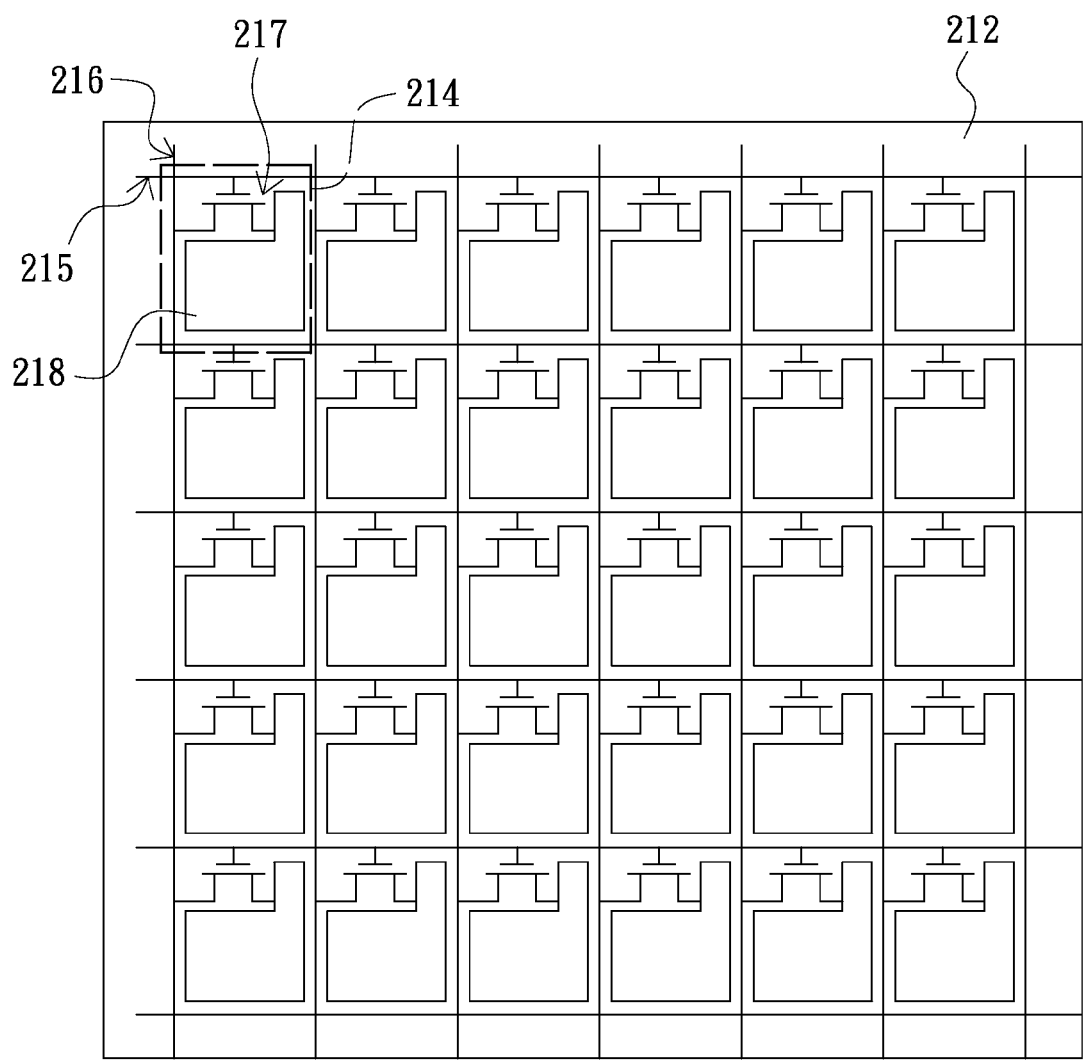
FIG. 5 is a schematic view illustrating a controlling elements array substrate according to an embodiment of the invention.

FIG. 5 is a schematic view illustrating a controlling elements array substrate according to an embodiment of the invention. Referring to FIG. 5, each pixel unit 214 comprises a scan line 215, a data line 216, a thin film transistor 217 and a pixel electrode 218. The thin film transistor 217 is electrically connected to the corresponding scan line 215 and the corresponding data line 216, each pixel electrode 218 is electrically connected to the data line 216 through the thin film transistor 217. That is, a thin film transistor array is used as controlling elements in this embodiment.

It should be noted that although the active controlling elements are used in this embodiment, the invention is not limited hereto. Those skilled in the art should know that the display panel of the invention also can be controlled by passive controlling elements array.

Figure 4B:
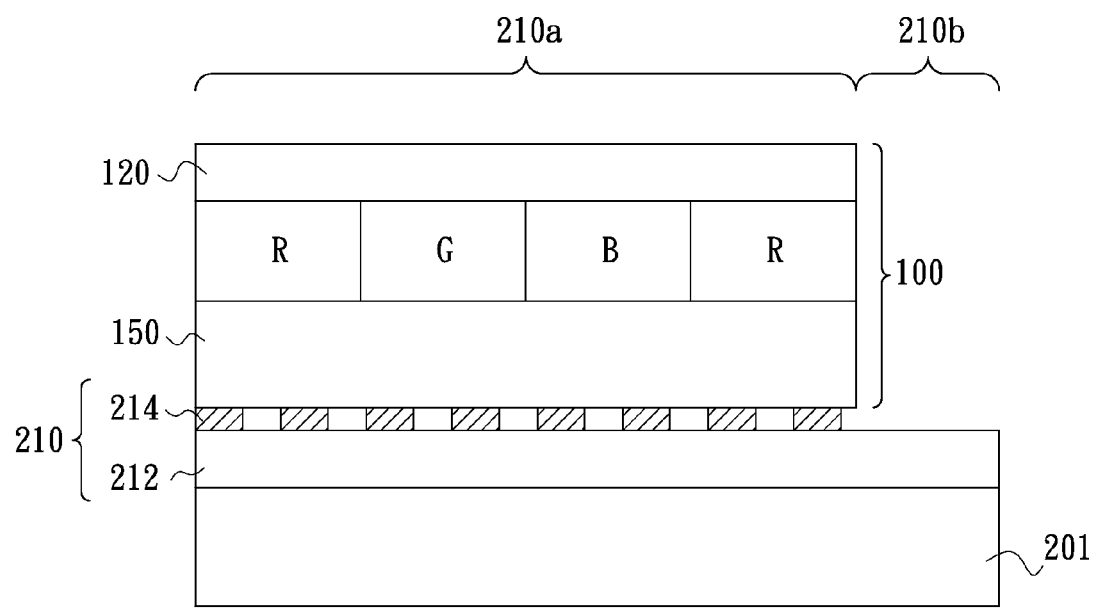

Referring to FIG. 4B, the flexible color display medium module 100 may be formed by the aforementioned steps. Then, the flexible color display medium module 100 and the controlling elements array substrate 210 are assembled to each other for locating the display medium layer 150 of the flexible color display medium module 100 in the display region 210a of the controlling elements array substrate 210.

Figure 4C:
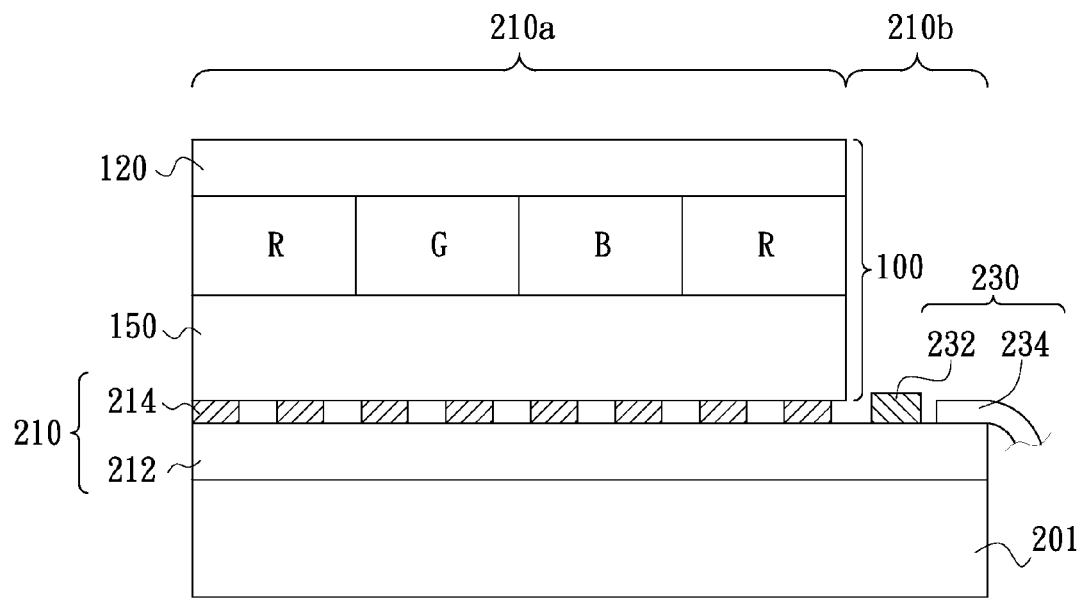

Referring to FIG. 4C, after assembling the flexible color display medium module 100 on the controlling elements array substrate 210, a driving circuit 230 is disposed in the peripheral circuit region 210b of the controlling elements array substrate 210. In detail, the driving circuit 230 comprises an IC circuit 232 and a flexible printed circuit 234. The IC circuit 232 is used for driving the pixel units 214 disposed in the peripheral circuit region 210b and the flexible printed circuit 234 is used for electrically connecting the IC circuit 232 to the external circuit (not shown in FIG. 4C). In this embodiment, the IC circuit 232 may disposed on the controlling elements array substrate 210 by chip on class process, chip on film process or tape automatic bonding process and electrically connected to the pixel units 214 disposed in the display region 210a.

Figure 4D:
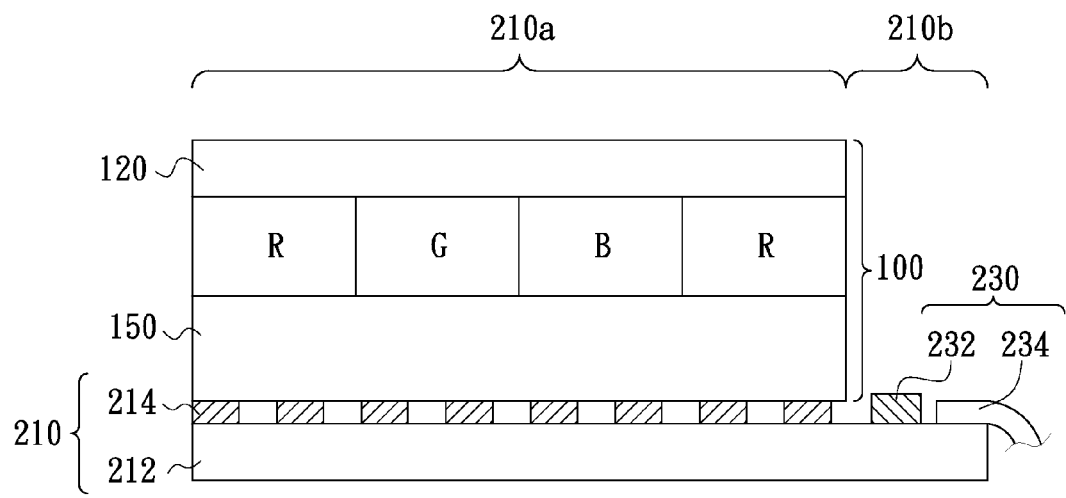

Specially, the controlling elements array substrate 210 is separated from the rigid substrate 201 after disposing the driving circuit 230 thereon to form the display panel 200 shown in FIG. 4D. In this embodiment, the substrate 212 may also separated from the rigid substrate 201 by laser releasing method.

Since the flexible substrate is formed on the rigid substrate first, and then the color filter film and the display medium layer are formed on the flexible substrate in sequence before separating the flexible substrate from the rigid substrate during the fabricating process of the flexible color display medium module of the invention, the flexible color display medium module of the invention comparing to the conventional color filter fabricated by roll-to-roll process has improved elements resolution, process yield and capacity.

Furthermore, the display medium layer is disposed immediately on the color filter film, so the accuracy of aligning the display medium layer and the color filter film may be increased and the parallax resulted from the refraction optical path difference of the light passed through the display medium layer and the color filter film may be decreased.

Besides, the display panel of the invention may comprise the aforementioned flexible color display medium module and a flexible controlling elements array substrate. The controlling elements array substrate is formed on a rigid substrate first and separated therefrom after disposing the driving circuit on the flexible controlling elements array substrate. Accordingly, the pixel units of the invention may be formed by the multi-mask process to achieve the best resolution of 1 micrometer, and the flexible substrate may be prevented from deforming as disposing the driving circuit thereon. Therefore, the yield of the driving circuit may avoid decreasing.

In summary, the flexible color display medium module may be produced in mass production scale by the fabricating process of the invention. Moreover, the yield of the flexible color display medium module and the display panel with the same may be increased and the resolutions of the flexible color display medium module and the display panel may be improved. Furthermore, the parallax of the images displayed by the display panel may be decreased by the flexible color display medium module of the invention.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flexible color display medium module, consisting of:
   a color filter, consisting of:
      a flexible substrate; and
      a color filter film comprising a plurality of color filter patterns disposed on the flexible substrate; and
   a display medium layer disposed on the color filter film.

2. The flexible color display medium module as recited as claim 1, wherein the color filter film further comprises a light-shielding layer with a plurality of openings disposed on the flexible substrate, and the color filter patterns are formed in the openings.

3. The flexible color display medium module as recited as claim 1, wherein the color filter patterns comprise red color filter patterns, green color filter patterns and blue color filter patterns.

4. The flexible color display medium module as recited as claim 3, wherein the color filter patterns further comprise white color filter patterns.

5. The flexible color display medium module as recited as claim 1, wherein the color filter patterns comprise cyan color filter patterns, yellow color filter patterns and magenta color filter patterns.

6. The flexible color display medium module as recited as claim 5, wherein the color filter patterns further comprise black color filter patterns.

7. The flexible color display medium module as recited as claim 1, wherein the material of the flexible substrate is polyimide, polyethylene terephathalate, polyether ether ketone, polyethylene naphthalene, polymethyl methacrylate, polystyrene, polyarylate, polycarbonate, TAO or ARTON.

8. The flexible color display medium module as recited as claim 1, wherein the display medium layer is an electrophoretic film or an electro-wetting film.

* * * * *